Jan. 27, 1942. T. PETERSEN 2,271,033
PIPE CUTTER
Filed Dec. 27, 1938
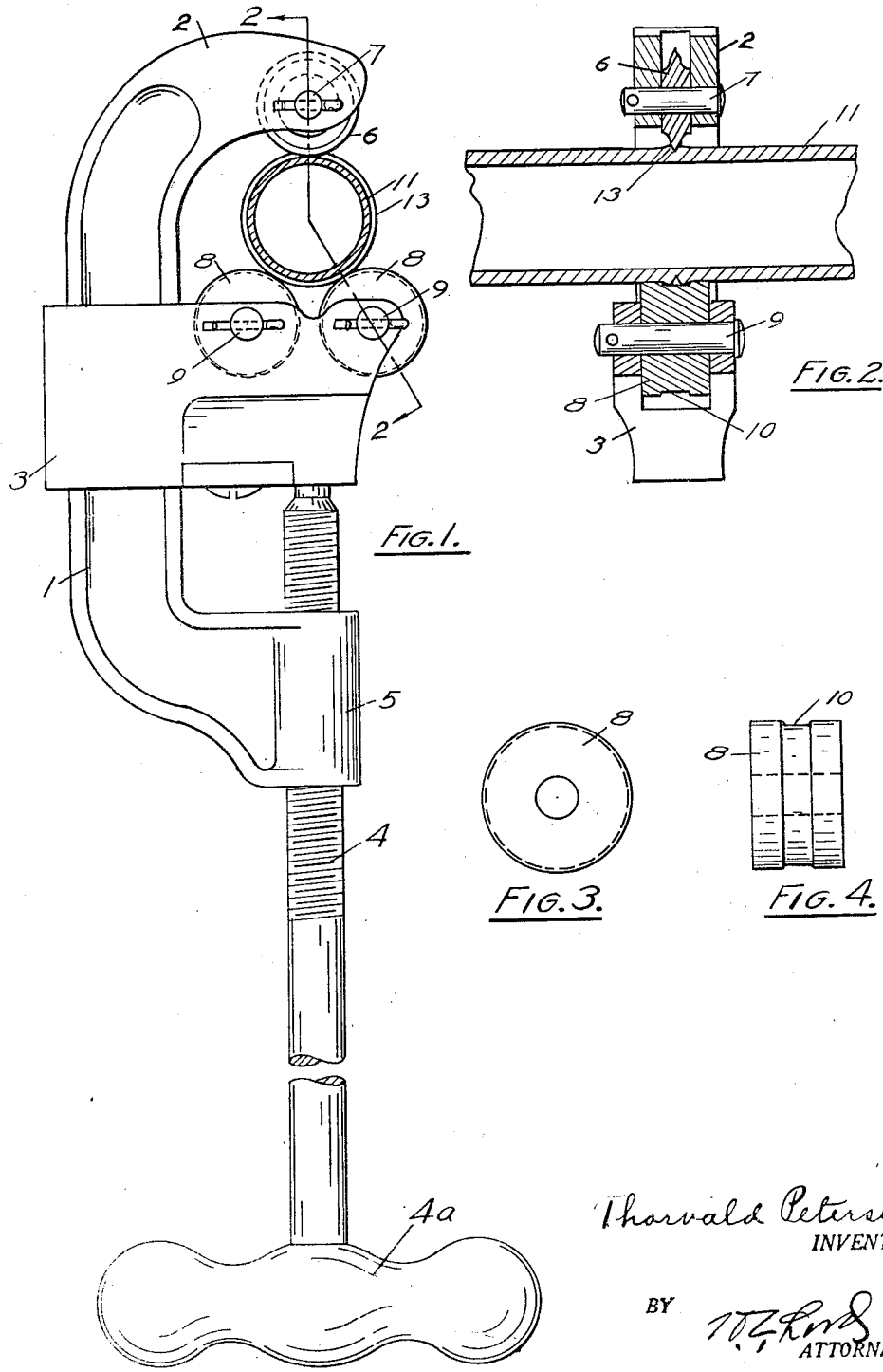

Patented Jan. 27, 1942

2,271,033

UNITED STATES PATENT OFFICE 2,271,033

PIPE CUTTER

Thorvald Petersen, Erie, Pa., assignor to Reed Manufacturing Company, Erie, Pa., a corporation of Pennsylvania Application December 27, 1938, Serial No. 247,769

2 Claims. (Cl. 30—102)

Pipe cutters, particularly those hand operated, usually employ cutter wheels for effecting the cutting of the pipe. The pipe cutters involving wheels, and particularly those hand operated, are of two types, one in which there are a plurality of opposing cutting wheels and the other in which there is a cutting wheel opposed by rollers. The type involving all cutting wheels has heretofore required less effort than the pipe cutter formed with a cutting wheel and opposing rollers. On the other hand, a pipe cutter provided with rollers has certain advantages. It tends to true the cutter with the pipe so as to effect a cut in a plane at right angles to the axis of the pipe and usually completes the cut with greater uniformity throughout the circumference of the pipe. It also rolls down the burr so that the pipe may more readily enter the guide openings in a threading tool.

The greater effort required with the roller is apparently due to the engagement of the burr by the roller.

In the present invention, a roller means is used for opposing the cutting wheel, preferably roller means involving a pair of rollers, each grooved to receive the burr formed by an opposed cutter wheel. With this structure the rollers operate or tend to square the cutter with the pipe. The cut is made with an effort approximating or even less than that accomplished by the opposing cutting wheels and the finish of the cut is smoother than that accomplished ordinarily with cutting wheels. Preferably in carrying out the invention, the stepped surface which in the preferred form is at the bottom of the groove, is so related to the pipe engaging surface of the rollers as to limit the extension of the burr beyond definite limits. Very little resistance is encountered by the rollers in smoothing out the thin edge or abnormal extension of the burr. In this way the burr may be definitely limited and consequently the guide sleeves of a thread cutting tool may closely approximate the size of the pipe and thus more definitely guide the pipe for thread cutting action. Features and details of the invention will appear from the specification and claims.

A preferred embodiment of the invention is illustrated in the accompanying drawing as follows:

Fig. 1 shows a side elevation of a pipe cutter.
Fig. 2 a section on the line 2—2 in Fig. 1.
Fig. 3 an end elevation of one of the rollers.
Fig. 4 a side elevation of a roller.

1 marks the shank of the pipe cutter; 2 the nose of the cutter; 3 an adjustable roller carrying block; 4 an operating screw terminating in the handle 4a, the screw extending through a nut 5 on the shank and being swiveled in the block 3. A wheel 6 is journaled on a pin 7 in the nose 2. So far the parts are of common construction.

Rolls 8 are journaled on pins 9 in the sliding block 3. These rollers are spaced and related to the cutting wheel to tend to center the rollers and wheel about the axis of the pipe as is common. The rollers are provided with grooves 10 affording a roller surface stepped from the pipe engaging surfaces at the sides of the groove. The groove is adapted to permit the entrance of a burr 13 formed in a pipe 11. The depth of the groove has relation to the burr formed by the wheel, to limit the extension of the burr. This is accomplished by rolling out the extreme outer edge of a burr or any abnormal projections thereof. Thus the burr extension on a pipe cut with the rollers so arranged is made definite. This is of importance in that it makes it possible to provide guide sleeves for threading tools more nearly approximating the diameter of the pipe than would be the case if the burr were permitted an unlimited extension. On the other hand, so little of the burr is engaged by the stepped surface that very little added effort is required to accomplish this result. On the other hand, the provision of the groove eliminates the resistance ordinarily encountered with the roller type of pipe cutter.

What I claim as new is:

1. In a pipe cutter the combination of a cutter wheel; opposing roller means having pipe engaging surfaces spaced with relation to the cutter wheel to bridge the cut and burrs formed by the cutter wheel in severing a pipe; an axially extending roller surface between, and stepped with relation to, the spaced engaging surfaces, the stepped surfaces being constructed and arranged to limit and size, by engagement of the stepped surface, the burrs formed by the cutter wheel; and means for mounting the cutter wheel and roller in operative relation.

2. In a pipe cutter the combination of a cutter wheel; an opposing roller having a groove in its periphery having the surface at the bottom of the groove extending axially the width of the groove permitting the bridging of the cut formed by the cutter and the burrs formed thereby, and the depth of the groove having relation to the cutter and a burr formed thereby to limit and size the burr formed by the cutter wheel; and means mounting the wheel and roller in operative relation.

THORVALD PETERSEN.